Figure 1:
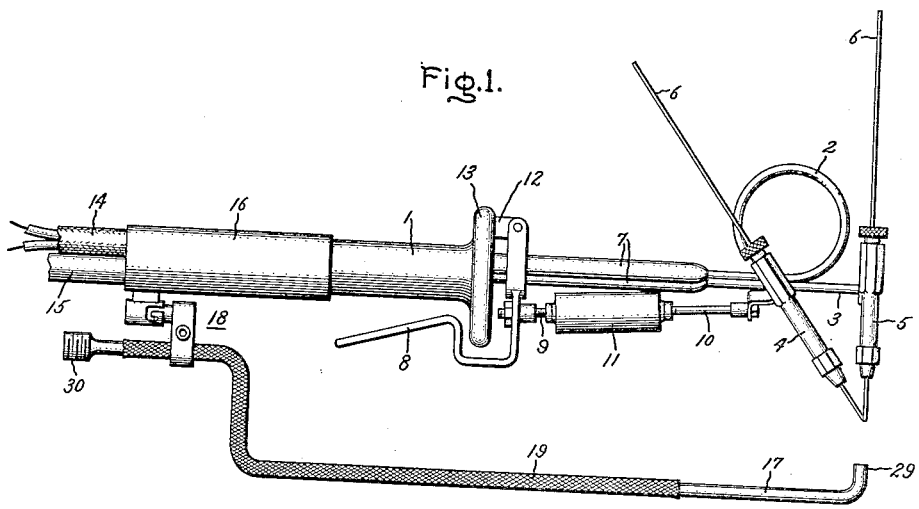

Nov. 19, 1946.   G. RICHARDSON ET AL   2,411,465
GAS-ARC HAND TORCH
Filed Oct. 21, 1944

Inventors:
George Richardson,
John Horlick,
by Harry E. Dunham
Their Attorney.

Patented Nov. 19, 1946

2,411,465

UNITED STATES PATENT OFFICE 2,411,465

GAS-ARC HAND TORCH

George Richardson and John Horlick, Lynn, Mass., assignors to General Electric Company, a corporation of New York Application October 21, 1944, Serial No. 559,696

4 Claims. (Cl. 219—14)

Our invention relates to gas-arc torches which are adapted to be carried and manipulated by a welder engaged in performing gas shielded arc welding operations on work parts to be united by a weld. Such torches are commonly referred to as gas-arc hand torches.

Experience has indicated that certain metals are most satisfactorily fabricated by a gas shielded arc welding procedure. In accordance with this arc welding procedure, gas is supplied to and about the welding arc established between an electrode and the work or between two electrodes having their arcing terminals spaced closely adjacent the work as well as to the portions of the work rendered molten by the action of the arc.

One well-known form of gas-arc welding is atomic hydrogen welding wherein the heating effect of a "flame" of atomic hydrogen is employed in making the weld. This atomic hydrogen flame may be produced by dissociated hydrogen to its atomic state through the agency of an electric arc established between cooperating electrodes. The recombination of this atomic hydrogen at or near the work liberates an enormous amount of heat which may be used for welding or like operations. The utilization of flames of atomic hydrogen is disclosed and claimed broadly in United States Letters Patent 1,947,267, Irving Langmuir, granted February 13, 1934, and assigned to the assignee of our present invention. While our invention is well suited for use with atomic hydrogen torches of the character above described, it may also be used with other gas-arc torches where a welding medium of any suitable character is supplied to and about the arcing terminal of an electrode and its arc which supplies the heat used in performing the welding operation.

Experience has also indicated that for certain gas-arc welding operations best results are obtained when the back of the weld is shielded by a protective gas at the zone of welding. This shielding of the reverse side of the work part at the welding zone facilitates the formation of a weld between metal sheets and prevents oxidation of and the formation of scale on the back surfaces of these sheets at the weld. It also makes it possible to obtain a sound weld of pleasing appearance and to avoid the use of welding fluxes which frequently go into solution with the weld and embrittle it. Arrangements heretofore proposed for accomplishing this shielding operation require special work holding members which are not always available or particularly suited for the welding operation to be performed.

It is consequently an object of our invention to provide a gas-arc hand torch in which a gas pipe mounted on and movable with the torch is provided for supplying a jet of shielding gas to the reverse side of a work part where its other side is acted on by a gas shielded arc whose position relative to the work part is determined by the welder's manipulation of the torch.

It is a further object of our invention to obtain the desired gas shielding of the reverse side of a work part during welding by mounting and spacing the gas pipe therefor on the gas-arc torch of which it forms a part so that free manipulation of the torch and a wide range of movement thereof over the work is permitted without interference between the gas pipe and the work or between the work and the welder's hand closed on the handle of the torch.

It is another object of our invention to provide a quick detachable connection between this gas pipe and the remainder of the torch so that when gas shielding of the back portion of the welding area is not required, the gas pipe provided therefor may be removed to increase the mobility of the torch for this use thereof.

It is also an object of our invention to insulate electrically that portion of the torch's detachable gas pipe which is within contact making range of the operator's hand employed in holding the handle of the torch and in operating the arc controlling means thereof which may be mounted on or closely adjacent the handle of the torch.

Further objects of our invention will become apparent from the following description of an embodiment thereof illustrated in the accompanying drawing.

Figure 2:
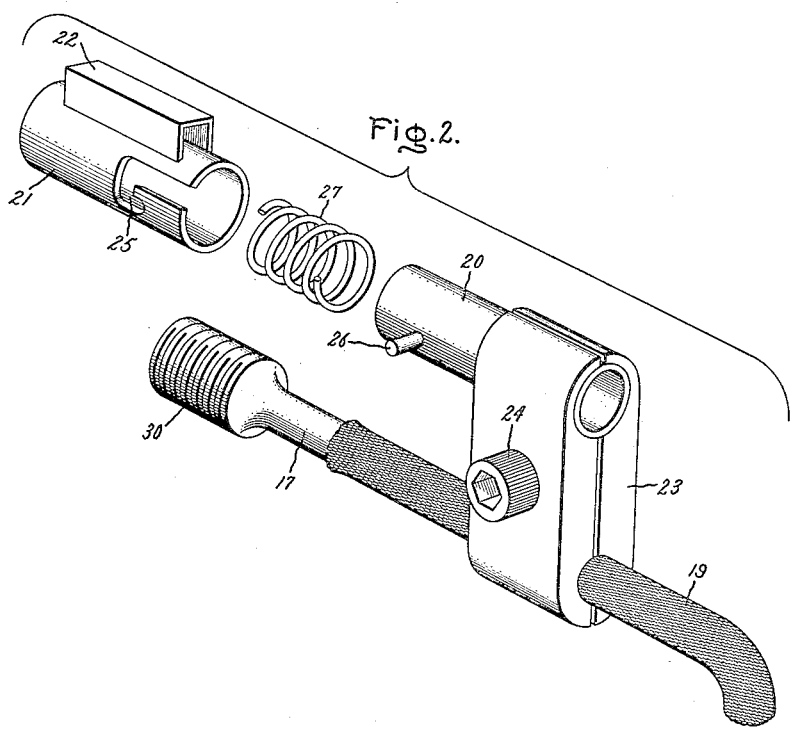

Fig. 1 of this drawing is a side view of an atomic hydrogen torch embodying our invention and Fig. 2 is an exploded view of the detachable coupling connected between the handle of the atomic hydrogen torch and the pipe mounted thereon for supplying shielding gas to the back of a weld during its formation by a frontal application of the atomic hydrogen flame of the torch.

In accordance with our invention a gas pipe forming a unitary part of a gas-arc torch is provided for supplying a jet of shielding gas to the reverse side of a work part where its other side is acted on by a gas shielded arc whose position relative to the work part is determined by the welder's manipulation of the torch. This gas pipe extends along and is spaced from the supporting structure for the one or more electrode holders and nozzles of the torch to form a gap into which the work may extend during welding. When the electrode holder and nozzle supporting structure of the torch extends from the front end of the torch handle, this gas pipe is preferably attached to the rear end thereof in order to provide as long a work receiving gap as possible between these members of the torch. This gas pipe is advantageously supported on the torch handle by a quick detachable connection and is preferably insulated at its connection with the torch handle and along that portion thereof adjacent the handle. The discharge end of this gas pipe is located in front of and spaced from the arcing electrode terminal or terminals of the torch by an amount enabling proper manipulation thereof during welding along one side of a work part without interfering with the jet of shielding gas supplied through the discharge end of this gas pipe to the reverse side of the work part. Means at the handle of the torch are provided for supplying shielding gas to this pipe and for supplying gas and arcing current respectively to the passageway and electrical connection embodied in the supporting structure for the electrode holding gas nozzle or nozzles of the torch.

The gas-arc torch shown in Fig. 1 is a hand torch adapted to be carried and manipulated by a welder. It comprises a handle 1 of electrically insulating material from the front end of which project metallic tubes 2 and 3 having mounted at their outer ends angularly disposed metallic electrode holding gas nozzles 4 and 5. These gas nozzles have tip openings of greater size than the tungsten electrodes 6 held thereby with their arcing terminal portions projecting through these tips. Tubes 3 and 4 are electrically connected by means of nozzles 4 and 5 with electrodes 6 held thereby and have gas passageways extending therethrough which communicate with the gas passageways in nozzles 4 and 5. Sleeves of insulating materials 7 are provided about those portions of tubes 2 and 3 which are adjacent handle 1 of the torch.

Means adjacent handle 1 of the torch is provided for controlling the separation of nozzles 4 and 5 and consequently the arc gap between the arcing terminals of electrodes 6 supported thereby. This means includes a lever 8 connected to nozzle 4 by rods 9 and 10 which are mechanically connected but electrically insulated from one another by a member 11. Lever 8 is pivoted on a bracket 12 mounted on a guard 13 forming the front end portion of handle 1. Movement of lever 8 will consequently move nozzle 4 and the electrode supported therein relative to nozzle 5 and the electrode supported therein. This limited movement is made possible by providing tube 2 with a looped portion which is sufficiently resilient for this purpose and which also acts as a spring member which tends to hold the nozzles and the electrodes therein in a given position relative to one another.

Means extending through handle 1 of the torch and electrically insulated therefrom are provided for supplying gas and arcing current respectively to the nozzle supporting tubes 2 and 3 which project from the front end of this handle. This means terminates in connections for the flexible twin conductor cable 14 and the end of a flexible gas hose 15 which are both enclosed within a metallic sleeve 16 mounted on and forming the rear end portion of handle 1 of the torch. The twin conductors of cable 14 are connected to the terminals of a source of suitable arcing current, and hose 15 is connected to a source of suitable gas. For an atomic hydrogen torch such as that illustrated, the gas will be hydrogen or a mixture of gases containing a high percentage of hydrogen and the source of voltage will have an open circuit value sufficient to enable the welder to strike and maintain an arc in the hydrogen atmosphere which shields the arc and the work part adjacent to and subjected to the action of the arc.

The gas-arc torch thus far described embodies the construction of the atomic hydrogen torch more fully illustrated and described in United States Letters Patent 2,014,226, James T. Catlett, granted September 10, 1935, and assigned to the assignee of our present invention.

Such a torch is readily converted into a torch embodying our invention by providing it with a gas pipe 17 which is mounted on and movable with the torch and has in front of and spaced from the arcing terminals of its electrodes a discharge opening for supplying a jet of shielding gas to the reverse side of a work part where its other side is acted on by the atomic hydrogen flame produced by the gas shielded arc established between the arcing terminals of its electrodes.

In accordance with our invention this gas pipe extends along and is spaced from handle 1 of the torch and the supporting structure provided by tubes 2, 3 for its electrode holding gas nozzles 4, 5 to form a gap into which the work may extend during welding. When the electrode holder and nozzle supporting structure of the torch extends from the front end of the torch handle as in the arrangement illustrated, this gas pipe is preferably attached to the rear end of the torch in order to provide as long a work receiving gap as possible between these members of the torch. In the arrangement illustrated this gas pipe is supported on the torch handle by a quick detachable connection 18.

That portion of gas pipe 17 extending along and beyond the handle of the torch and within contact making range of the operator's hand employed in holding the torch and operating lever 8 thereof, is electrically insulated by enclosing it in a glass fiber sleeve 19 formed of woven strands of glass. One member of the supporting coupling 18 for gas pipe 17 is mounted on the rear end of metallic sleeve 16 of torch handle 1, and the other member thereof is mounted on gas pipe 17 and electrically insulated therefrom by the glass fiber sleeve 19. The structural features of this coupling are illustrated in detail in the exploded view thereof in Fig. 2 of the drawing.

As shown in Fig. 2 of the drawing, the coupling is of the plug and socket type having a plug member 20 and a socket member 21. Socket member 21 is attached to the rear end of sleeve 16 of torch handle 1 through the agency of a channel-shaped member 22 which is welded to sleeve 16 and to socket member 21. Plug member 20 is mounted on an inturned end of gas pipe 17 by means of a clamp 23 having jaw openings which engage one end of socket member 20 and a circumferential portion of gas pipe 17 which is enclosed in insulating glass sleeve 19 located thereon. The jaws of clamp 23 are opened and closed through the agency of a bolt 24 connecting the two parts thereof.

Socket member 21 of coupling 18 is provided with a hook-shaped slot 25 for a pin 26 mounted on the side wall of plug member 20 of the coupling. A helical spring 27, seated in the end of socket member 21 of the coupling will act against the end of plug member 20 of this coupling and hold pin 26 thereof latched in the hooked end of slot 25 of socket member 21 after these members have been assembled against the action of spring 27 and given a slight turn to attain this latching action.

The discharge end 29 of gas pipe 17 is turned toward the arcing terminals of electrodes 6 supported in nozzles 4, 5 of the torch and spaced from these terminals by an amount enabling proper manipulation of the arc between the terminals of the electrodes during a gas shielded arc welding operation performed thereby on one side of a work part while gas is supplied through the discharge opening in end 29 of gas pipe 17 to the reverse side of the work part. Furthermore it will be noted that the gas pipe is given a configuration such that it is spaced from the rest of the torch structure to provide free manipulation of the torch and free passage of the work part past the handle thereof and the welder's hand closed on this handle. Gas is supplied to the coupling supported end of gas pipe 17 through a suitable connection, one part 38 of which has been illustrated in the drawing.

It is thus apparent that we have provided a gas-arc hand torch with means forming a unitary part thereof for supplying a stream of gas to the reverse side of a work part where its other side is acted on by a gas shielded arc whose position relative to the work part is determined by the welder's manipulation of the torch. It is also apparent that the free manipulation of the torch and a wide range of movement thereof over the work is permitted without interference between the gas pipe and the work or between the work and the welder's hand closed on the handle of the torch. Furthermore the gas pipe is detachably coupled with the torch so that when not required for performing a welding operation it may be removed from the torch to increase its mobility for performing other welding operations for which it is suited. By electrically insulating that portion of the detachable gas pipe of the torch which is within contact making range of the operator's hand employed in holding the torch or in operating the arc controlling lever 18 thereof, the operator has been effectively protected against the dangers of accidental shock which might occur by reason of the gas pipe coming into contact with the work.

It is of course apparent that our invention is not limited in its application to gas-arc hand torches of the construction illustrated since it may be applied equally well to any gas-arc torch whether the arc is maintained between a plurality of electrodes or between a single electrode and the work. Furthermore the gas pipe by means of which the shielding jet of gas is supplied to the back side of a weld may have other configurations than that illustrated. For example, a U-shaped turn may be formed in the end of this pipe where it is mounted on the torch in order to increase the depth of the work throat between it and the rest of the torch of which it forms a part. Another obvious variation is to make gas pipe 17 of electrically insulating material or to provide a metallic gas pipe 17 with other forms of insulation, such for example as an insulating coating of enamel extending throughout its length and including the discharge end thereof, so that this pipe is completely insulated from the work part which it may accidentally engage during a welding operation.

These and other variations of our invention will occur to those skilled in the art, and we aim therefore to cover in the appended claims all such modifications which fall within the true spirit and scope of our invention.

What we claim as new and desire to secure by Letters Patent of the United States is:

1. A gas-arc torch adapted to be carried and manipulated by a welder, said torch comprising a handle, an electrode holder, a nozzle having a discharge opening through which gas is directed about the arcing terminal of an electrode supported in said holder and onto the surface of a work part adjacent the arcing terminal of said electrode, a structure supported by and extending from said handle and in itself constituting a support for said holder and said nozzle, said structure embodying a gas passageway terminating in said nozzle and an electrical connection forming part of a circuit for supplying arcing current to an electrode in said holder, a gas pipe forming a unitary part of said torch and extending along and being spaced from said supporting structure for said holder and said nozzle to form a gap into which the work may extend during welding, said pipe having a discharge opening located in front of the arcing terminal of an electrode supported in said holder and spaced therefrom by an amount enabling proper manipulation of said electrode for a gas shielded welding operation along one side of a work part while supplying gas to the reverse side of said work part, and means at said handle for supplying gas to said pipe and gas and arcing current respectively to the passageway and electrical connection embodied in said supporting structure for said holder and said nozzle.

2. A gas-arc torch adapted to be carried and manipulated by a welder, said torch comprising a handle, an electrode holder, a nozzle having a discharge opening through which gas is directed about the arcing terminal of an electrode supported in said holder and onto the surface of a work part adjacent the arcing terminal of said electrode, a structure supported by and extending from one end of said handle and in itself constituting a support for said holder and said nozzle, said structure embodying a gas passageway terminating in said nozzle and an electrical connection forming part of a circuit for supplying arcing current to an electrode in said holder, a gas pipe supported on the other end of said handle and extending along and spaced from said handle and said supporting structure for said holder and said nozzle to form a gap into which the work may extend during welding, said pipe having a discharge opening located in front of the arcing terminal of an electrode supported in said holder and spaced therefrom by an amount enabling proper manipulation of said electrode for a gas shielded welding operation along one side of a work part while supplying gas to the reverse side of said work part, and means at said handle for supplying gas to said pipe and gas and arcing current respectively to the passageway and electrical connection embodied in said supporting structure for said holder and said nozzle.

3. A gas-arc torch adapted to be carried and manipulated by a welder, said torch comprising a handle, an electrode holder, a nozzle having a discharge opening through which gas is directed about the arcing terminal of an electrode supported in said holder and onto the surface of a work part adjacent the arcing terminal of said electrode, a structure supported by and extending from one end of said handle and in itself constituting a support for said holder and said nozzle, said structure embodying a gas passageway terminating in said nozzle and an electrically insulated connection forming part of a circuit for supplying arcing current to an electrode in said holder, an electrically conducting gas pipe supported by a quick detachable coupling on the other end of said handle and extending along and spaced from said handle and said supporting structure for said holder and said nozzle to form a gap into which the work may extend during welding, said pipe having a discharge opening located in front of the arcing terminal of an electrode supported in said holder and spaced therefrom by an amount enabling proper manipulation of said electrode for a gas shielded welding operation along one side of a work part while supplying gas to the reverse side of said work part and said pipe being electrically insulated at said coupling and along that portion thereof adjacent said handle, and means at said handle for supplying gas to said pipe and gas and arcing current respectively to the passageway and electrical connection embodied in said supporting structure for said holder and said nozzle.

4. A gas-arc torch adapted to be carried and manipulated by a welder, said torch comprising a handle, a plurality of electrically conductive tubes projecting from the front end of said handle and having mounted at their outer ends a plurality of angularly disposed electrode holding gas nozzles having tip openings of greater size than the electrodes held by said nozzles with their arcing terminal portions projecting through said tips, said tubes being electrically connected with said electrodes held by said nozzles and having gas passageways communicating with the gas passageways in said nozzles, means adjacent said handle for controlling the separation of said nozzles and consequently the arc gap between the arcing terminals of electrodes supported thereby, a metallic pipe forming a unitary part of said torch and having a body portion extending along and spaced from said handle, said last mentioned means and said nozzle supporting tubes to form a gap for the passage of work between said pipe and said tubes, said last mentioned means and a welder's hand closed on said handle, said pipe having a discharge opening in front of the arcing terminals of said electrodes in said nozzles from which it is spaced by an amount enabling proper manipulation of said arcing terminals of said electrodes during a gas arcing terminals of said electrodes during a gas shielded arc welding operation performed thereby on one side of a work part while gas is supplied through said discharge opening of said pipe to the reverse side of said work part, an electrically insulating glass fiber sleeve enclosing that portion of said pipe extending along and beyond said handle within contact making range of the operator's hand employed in holding said handle and operating said means for controlling the separation of said nozzles, a quick detachable coupling between said pipe and said handle one member of said coupling being mounted on the rear end of said handle and the other member thereof being mounted on said pipe and electrically insulated therefrom by said glass fiber sleeve, means at the coupling supported end of said pipe for supplying gas thereto, and means extending through said handle for supplying gas and arcing current respectively to said nozzle supporting tubes projecting from said handle.

GEORGE RICHARDSON.
JOHN HORLICK.